United States Patent [19]

Lipton

[11] 4,418,993
[45] Dec. 6, 1983

[54] STEREOSCOPIC ZOOM LENS SYSTEM FOR THREE-DIMENSIONAL MOTION PICTURES AND TELEVISION

[75] Inventor: Lenny Lipton, Point Richmond, Calif.

[73] Assignee: Stereographics Corp., San Rafael, Calif.

[21] Appl. No.: 261,302

[22] Filed: May 7, 1981

[51] Int. Cl.³ ............................................. G03B 35/00
[52] U.S. Cl. ...................................... 352/57; 352/60; 352/62
[58] Field of Search ...................... 352/57, 59, 60, 62, 352/140, 86

[56] References Cited

U.S. PATENT DOCUMENTS

| | | | |
|---|---|---|---|
| 2,583,030 | 1/1952 | Waller et al. | 352/59 |
| 2,630,737 | 3/1953 | Ramsdell | 352/60 |
| 2,737,082 | 3/1956 | Dowling | 352/59 |
| 2,753,774 | 7/1956 | Norling | 352/57 |
| 2,838,975 | 6/1958 | Laube et al. | 352/59 |
| 2,868,065 | 1/1959 | Tondreau | 352/59 |
| 3,019,698 | 2/1962 | Sheldon | 352/60 |

FOREIGN PATENT DOCUMENTS

| | | | |
|---|---|---|---|
| 602205 | 3/1926 | France | 352/57 |
| 693174 | 6/1953 | United Kingdom | 352/59 |
| 197712 | 12/1978 | U.S.S.R. | 352/57 |

Primary Examiner—Monroe H. Hayes
Attorney, Agent, or Firm—J. William Wigert, Jr.

[57] ABSTRACT

Paired movie cameras, each having synchronized movements and in phase shutters, are provided with focus and zoom optics of identical, but conventional and commercial manufacture. The paired lenses are first rotated relative to one another to obtain a coincidence between the centration vector for each lens for either zoom or focus. Once the centration vectors are aligned identically on a polar basis, mounting to the camera with provision for synchronous zoom between the respective cameras thereafter occurs. Typically, and before each stereo shooting, the zoom optics are set to a maximum magnification and registered to the appropriate distance with the lens finders and reticules. Upon change of the focus and/or zoom setting, a variable prism affixed to one camera is moved relative to the remaining camera to maintain identical centration between the respective lens cameras. This movement can be cam controlled or, microprocessor controlled using stepping motors or servo systems and can also occur either in relative pitch and yaw; or in relative camera lens translation. At a minimum, centration must be corrected so that resultant screen parallaxes for an observer will be maintained to within Panum's Fusion limit (about 1/10 of a degree in vertical plane and 2/10 of a degree horizontal plane). A stereoscopic system which accommodates zoom lenses is disclosed.

26 Claims, 12 Drawing Figures

STEREOSCOPIC ZOOM LENS SYSTEM FOR THREE-DIMENSIONAL MOTION PICTURES AND TELEVISION

This invention relates to the taking of stereoscopic motion pictures and more particularly discloses a synchronized shutter camera ensemble and optically synchronized stereoscopic zoom lens system. The technology disclosed herein may also be applied to the design of stereoscopic television cameras or to cameras for taking still photographs and for various other applications, such as microscopy and artificial intelligence.

STATEMENT OF THE PROBLEM

The reader will understand that in the following statement of the problem, comment will be made directed to the scope of this invention. It goes without saying that understanding of the problem to be solved can constitute an important part of any invention.

The art of stereoscopic filmmaking has been hampered by the lack of suitable zoom optics. Some workers question this statement, since they believe the stereoscopic zoom is an undesirable effect, one which would cause confusion and eyestrain. McAdam (Journal SMPTE; Feb. 1954) is especially concerned with anamolous perspective effects which he claims would result from zoom photography.

I have been unable to locate stereoscopic zooms in the prior art, using coordinated zoom lenses. Heretofore, zooms have been produced in stereo by optical printing techniques. This results in an increase in granularity, a decrease in sharpness and an overall degradation of image quality proportional to the magnification of the image. A stereoscopic zoom lens, composed of twin objectives, can be employed in a single or double band stereoscopic motion picture camera design. In a single band system, paired stereoscopic frames appear on the same piece of film. In a double band system, two films are used and synchronized in photography and in their showing. In either case, when a single or double band of film is employed, certain fundamental conditions of matching the lenses must occur.

Both lenses must correspond in terms of focal length and distance for focus setting to within specifiable tolerances. Differential errors in relative image magnification between one camera relative to the other camera will result if focal length and focus of both cameras are not made to match. The resultant stereoscopic display—by whatever means, but especially by the technique of superimposed projection employing image selection by polarized light—will have spurious parallax, if the lenses are not matched for magnification.

In this disclosure I am assuming that centration errors are not occurring because of mis-setting of focal length and focus controls. Means for the coordination of focusing and zooming of two lenses are well known in the art, and need not be explained here. It is assumed rather that any decentration effects which may be corrected by the means taught in this disclosure arise from other causes, which are usually the result of wandering of lens elements or sections brought about by mechanical or optical misalignment in the lens construction as focusing and zooming take place.

Spurious parallax is a direct result of recentration of stereoptics and has the effect of creating eyestrain in viewers. Most importantly, this parallax may have a vertical and horizontal component. Typically, the eye can combine and tolerate relatively large portions of horizontal misalignment. However, even small amounts of vertical parallax resulting from vertical decentration between paired zoom optic lenses utilized in stereo cameras produce eyestrain in the viewer. Any value of vertical parallax can be considered to be spurious. This quantity and the resultant vertical disparity is not a depth cue and displays no depth information. Attempts to fuse such images will create discomfort for the eyes of the viewer, if the magnitude of the vertical parallax exceeds the limits set by Panum's Fusional Area, of approximately 1/10 of a degree of arc. (K. Ogle in *Researches in Binocular Vision* (Hafner, 1972) cites various authorities giving a range for Panum's Area as from 6 to 44 minutes of arc horizontal to from 3 to 14 minutes of arc vertical.)

Workers in the field understand that image quality of stereo lenses and cameras must be carefully matched between the left and right lenses. As mentioned, image magnification, determined essentially by focal length and also to some extent by focus, must be the same to within very close tolerances. Moreover, both lenses must produce images of the same color, density and correction for abberation. In all ways, except for the single desirable quantity of horizontal parallax, the left and right images must be substantially identical.

SUMMARY OF THE INVENTION

I define the centration vector to have a magnitude equal to the distance of movement of the lens axis with respect to the zero center line of the frame as focus or focal length are changed. The direction of the centration vector is given by the direction of movement of the lens axis with respect to the reference zero center line. Such a centration vector may have vertical and horizontal components and these components are directly related to the introduction of spurious parallax to the photography.

Paired movie cameras, each having synchronized shutters, are provided with focus and zoom optics of identical, but conventional and commercial manufacture. If possible the paired lenses, in their mounts, are first rotated relative to one another to obtain a coincidence between their centration vectors. Once the centration vectors are aligned identically on a polar basis, mounting to the camera with provision for synchronous zoom between the respective cameras thereafter occurs. In the experimental camera rig I used, before taking a shot, the zoom optics were set to a maximum magnification and aligned with the lens finders' reticules using the Target Method, which is well known in the art. Upon change of the focus and/or zoom setting, one camera is moved relative to the fixed camera to maintain identical centration between the respective camera lenses. This movement can be mechanically or microprocessor controlled and can occur either in relative roll, pitch and yaw; relative camera translation; or by the insertion and adjustment of certain optical wedges. Relative movement to correct for centration changes in the vertical and horizontal plane do not have to be made any closer in tolerance than Panum's fusional limit (about 1/10 of a degree vertical and 2/10 of a degree horizontal).

OBJECTS, FEATURES AND ADVANTAGES

An object of this invention is to set forth a process for installing on cameras randomly chosen production zoom lenses utilized in taking stereoscopic pictures. According to this aspect of the invention, each lens has its respective centration observed first during focus, and thereafter during zoom. The respective lenses are typically found to have linear decentrations extending angularly off from the central axial path of the lens. By placing the respective zoom optics so that the centration vectors are on a common polar axis, coordination of centration is simplified and mounting can occur.

An advantage of this aspect of the invention is that when the centration vectors of the lenses are aligned parallel, minimal compensation need only occur. Moreover, and with respect to Panum's Fusional Limit, where horizontal decentration occurs, larger disparities can be accommodated.

Another object of this invention is to set forth a process for determining the zero setting of paired lenses upon taking zoom pictures. According to this aspect of the invention, the paired zoom lenses are moved to a position of maximum magnification. Thereafter, and using the reticule on through-the-lens finders, the respective cameras are centered. Thereafter, stereoscopic photography can occur.

An advantage of this aspect of the invention is that where the cameras are calibrated with maximum magnification settings, zooming to lower powers reduces the decentration error. This is because the overall magnification of the optics lessens and the relative decentration correspondingly lessen.

A further object of this invention is to disclose the necessary parameters for compensating paired optics during a zoom. According to this aspect of the invention, only one camera is moved relative to the other camera. Such movement is most important when applied in vertical compoonents to within Panum's Fusional Limit, typically a tenth degree in the vertical direction. Where desired, movement can occur in the horizontal plane for setting of convergence, where the tolerance of Panum's fusion limit is increased to two tenths of a degree on a horizontal plane.

An advantage of this aspect of the invention is that stereo zoom optical effects can be achieved. Advantages realized by a zoom lens for photography or cinematography or a zoom binocular can be realized in the zoom cinematography stereo field.

A further object of this invention is to show three general types of correction of recentration which may be applied to a stereoscopic zoom lens. In the first case, one or both of the cameras of the pair may be tilted or panned (angularly moved in pitch and yaw) in order to compensate for recentration which occurs in the course of zooming or focusing. In the second case the lens itself, which is mounted in a movable lens board, may be moved so that the lens axis of one or both of the cameras may be translated whilst remaining perpendicular to the plane of the film in order to compensate for recentration which can occur in the course of zooming or focusing, and thirdly, and preferred, a variable diopter power fluid filled prismatic wedge may be employed to compensate for changes in centration of one or both lenses as they are zoomed of focused.

It is of particular interest that all of the above methods may also be used to control convergence.

Other objects, features and advantages of this invention will be more apparent after referring to the following specification and attached drawings in which:

Accordingly, the subject of this patent is the related but unexplored area of control of the behavior of a pair of zoom lenses with regard to centration of optics, so that a coordinated stereoscopic zoom is produced. It is well known that centration of zoom lenses changes as focal length and focus are varied. The methods given here correct for this recentration so that spurious parallax is not introduced into the photography. As had been discussed, such spurious parallax is highly undesirable.

Figure 5A:
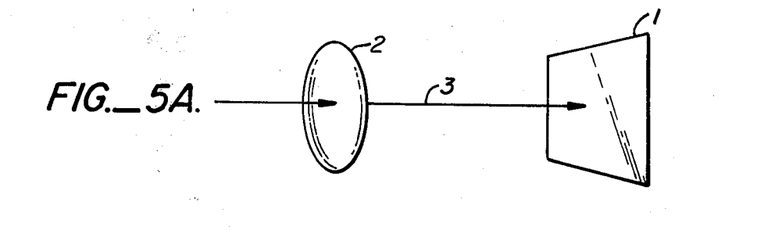
FIGS. 5A and 5B are schematic diagrams illustrating the decentration commonly experienced with respect to a camera lens and film plane.

In FIG. 5A, we have a schematic drawing showing the relationship between a lens 2 and the film plane 1 of a camera. The lens and camera are assumed to be perfectly aligned with respect to centration. Therefore, the lens axis 3 passes through the exact center of the frame or film plane 1. The lens axis 3 is in effect a perpendicular dropped to the center of the frame. In this case the zero center line of the frame and the lens axis coincide.

Figure 5B:
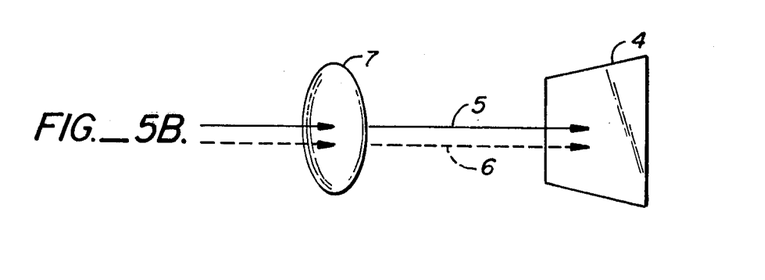

In FIG. 5B, we see that the zero center line 5, which is a line perpendicular to the center of film plane 4, does not coincide with the lens axis 6 of lens 7.

Because of imperfections in the design or fabrication of the lens mount, as the lens is zoomed or focused the lens axis will move with respect to the zero center line of the film plane. This movement is tolerable for planar photography, if kept to reasonably small values. For a zoom shot, vertical or horizontal wandering of the image can be disconcerting for the audience, therefore in well prepared objectives this effect is kept to a minimum.

If the recentration of the optics becomes large enough, in other words if the point where the lens axis intersects the film plane wanders away from where the zero center line intersects the film plane, we can also have a condition in which vignetting of a corner or corners of the frame becomes troublesome and calls attention to itself.

While easily controllable and relatively benign for planar work, the situation is far more serious for stereoscopic work, where any resultant recentration of optics, or shifts of the lenses axes with respect to the zero center lines of the frames, will result in spurious vertical and horizontal components of film parallax. Such spurious parallax in the horizontal direction can cause stereoscopic recomposition of the shot. The unpleasant esthetic effect on the screen is a movement or change of the volumetric composition with respect to the plane of the screen. In some cases the addition of unwanted horizontal parallax will increase low values of divergent parallax of distant homologous points beyond desirable limits. On the other hand, the parallax of near objects, which may be placed in front of the plane of the screen, can have added values of parallax which are beyond the predictions made at the time of photography.

Additions to the horizontal parallax, as enumerated here, are troublesome because they upset expectations concerning stereoscopic composition, and because they can add to eyestrain by creating excessively large values of screen parallax for near or far objects, requiring a correspondingly excessively large effort of vergence for the spectator.

The vertical component of parallax which can result from recentration is even more serious, since vertical parallax is alway undesirable in stereoscopic projection. As mentioned earlier, it provides no depth information, and will be a source of eyestrain since the eye muscles must act to fuse the homologous image points through unusual rotation in the vertical plane.

A pair of zoom lenses, no matter how carefully matched, can and do in practice recenter while focusing or zooming. The resultant shifts in screen parallax will destroy the intention of the stereoscopic photographer, and add eyestrain-producing elements to the photography.

Parallax at the film plane is defined as the distance between corresponding image points. If the left and right frames were perfectly superimposed so that the centers of each matched, then the distance between homologous points is defined as film parallax. Screen parallax is defined as the product of film parallax and linear image magnification.

Two approaches can be taken to eliminate recentration. They are: absolute and relative correction. In the absolute correction approach, the lens is carefully aligned so that at some setting the lens axis and the zero center line of the film plane coincide. Then mechanical or optical means are employed to maintain this alignment at other settings by translation of the lens axis, panning or tilting, or insertion of variable optical wedges. In this case no recentration takes place, and two such adjusted zoom lenses working together will produce no change in parallax as the lens is focused or zoomed. It is important to make clear that the parameter of focus and zoom must be handled separately.

For relative correction of anomolous shifts in parallax the recentration of each lens is matched. If the same relative recentration of left and right objectives takes place, there will be no change in parallax with zooming or focusing.

To accomplish relative recentration one must plot recentration curves as described below. For example, suppose we plotted recentration as a function of focal length for a pair of zoom lenses. Given two such sets of curves for left and right lenses, we can then plot sum or difference curves which could then be used for the control of centration of either the right or left lens in order to achieve a relative recentration of zero for the pair. In other words resultant curves are plotted from the sum or difference of curves for individual lenses. These resultant curves, which are either the vector sum or difference of recentration of the two lenses under study, may be applied to the appropriate lens to control its centration given any of the means discussed in this disclosure.

Figure 6A:
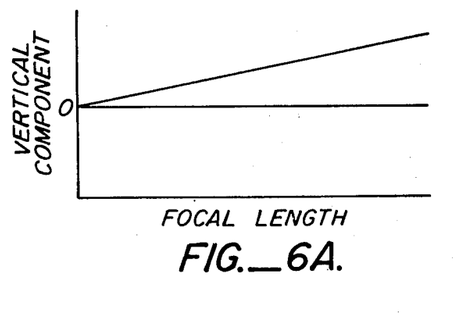
FIGS. 6A and 6B are representative graphs illustrating the change of centration upon zoom and focus change.
Figure 6B:
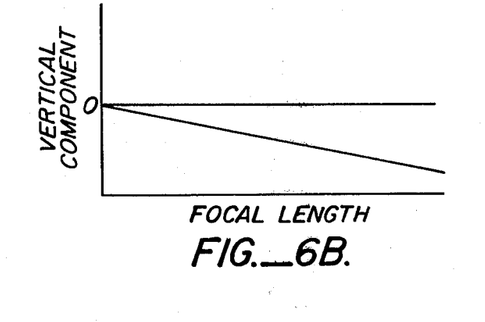

FIG. 6A shows a typical curve for the vertical component of the recentration vector for a zoom lens as a function of focal length. A similar curve could be plotted for recentration as a function of focusing distance. FIG. 6B shows a typical curve for the horizontal component of recentration for a zoom lens as a function of focal length. A similar curve could be plotted for recentration vectors as a function of focusing distance. Such curves are usually linear functions.

Units of the ordinate would usually be in fractions of a millimeter for distances measured at the film plane. Data points for such a graph can be acquired by mounting the photographic objective in a test projector. By projecting a reticule through the lens onto a target screen, we can compile data. Measurements taken from the screen are divided by the linear magnification of the image, and become the ordinate values of the graphs. FIGS. 5A and 5B schematically show such projection and FIGS. 6A and 6B illustrate the resultant change in centration due to changes in focus. Similar but usually differing curves will be gathered for changes in zoom.

Once such graphs have been established, they may be used to control the centration of the stereoscopic lens pair. As has been mentioned, there are two general approaches. We can make an absolute correction so that each lens maintains its centration, or we can use relative correction by controlling the centration so that the drift for both lenses is exactly matched. In either case, there will be no change in screen parallax when the lens is zoomed or focused.

Figure 1:
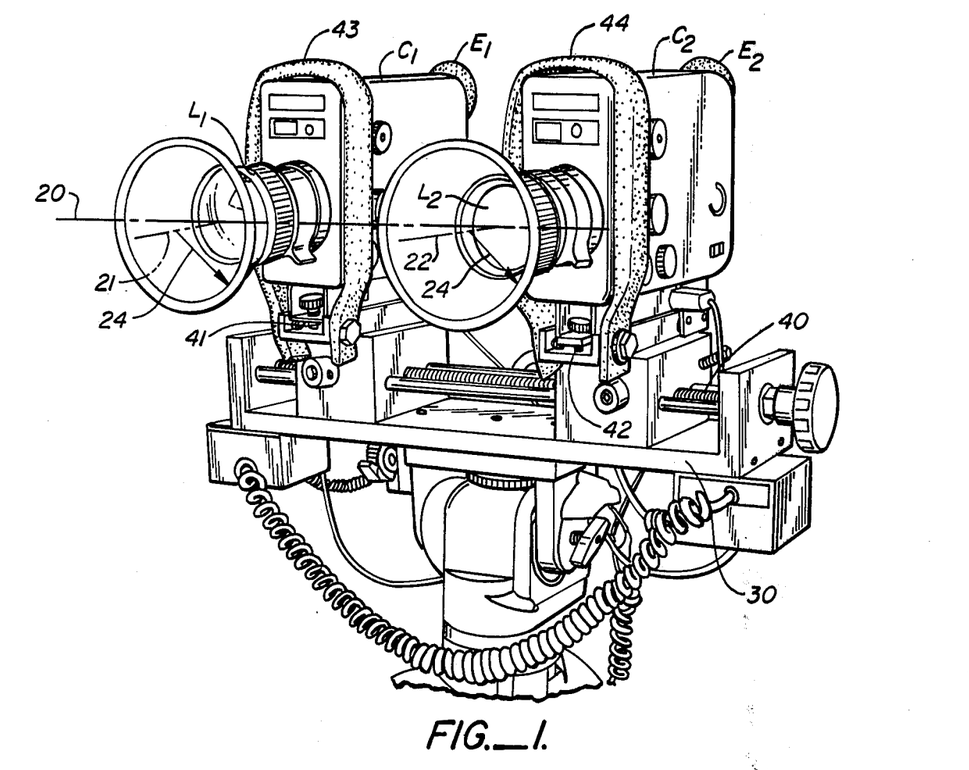
FIG. 1 is a perspective view of paired zoom cameras mounted for taking stereoscopic pictures according to the teachings of this invention.

Relative or absolute correction of centration may be applied in several ways. First, the generated empirical data can be applied to the calibration curves to generate appropriate rotation, i.e., tilts or pans, of the entire camera. This is especially useful when lenses may not be removed from the camera body. An embodiment where such shifting can occur is shown in FIG. 1. Thus, as the lens is zoomed, for example, there is a changing component of horizontal recentration, which can be nullified by a rotation (pan or tilt) of the camera exactly equal and opposite to the noted recentration. In this way the effective optical axis of the lens will remain coincident with the zero center line of the frame.

In a similar way correction can be applied to the vertical component of recentration and to both the left or the right camera. This would constitute absolute correction.

Figure 4:
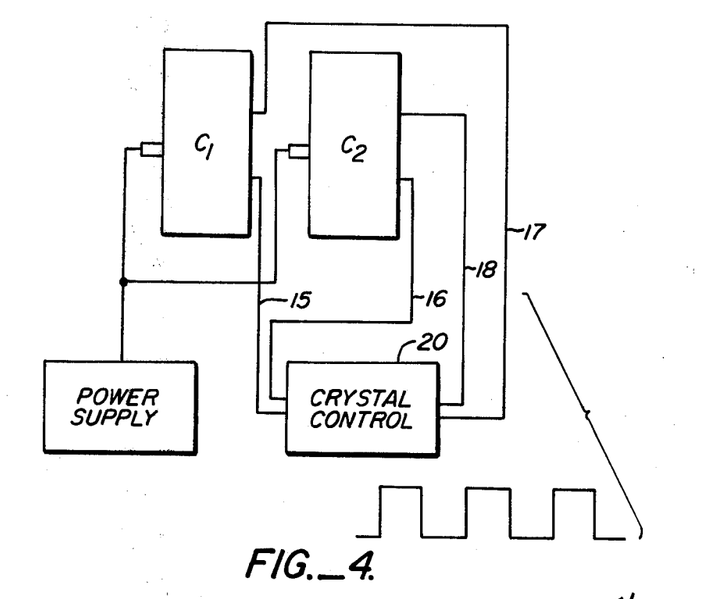
FIG. 4 is an electronic block diagram of the apparatus for synchronizing the shutters of the stereoscopic motion picture camera.

Referring to FIG. 1, apparatus for practicing an embodiment of my invention is illustrated. First and second movie cameras $C_1$, $C_2$ are shown mounted in spaced-apart near parallel relationship. These respective cameras have mounted and attached thereto zoom lenses $L_1$, $L_2$. The cameras therein mounted are equipped with a synchronous and in phase movement of their respective shutters by circuitries schematically illustrated in FIG. 4. This is well traveled art and will be dealt with here briefly. Many embodiments are possible. From the shutter mechanism of each camera, there is taken a sychronous signal here shown in FIG. 4 at leads 15 for camera $C_1$ and 16 for camera $C_2$. These synchronous signals are fed through a crystal control which interrupts power to the respective shutter motor mechanisms at leads 17 for camera $C_1$ and 18 for camera $C_2$. Crystal control 20 thus causes interruption in the power train to the shutter mechanism of each camera so that the camera frames are taken in precise synchronization.

Returning to FIG. 1, and realizing that the shutters are run in synchronism, the calibration of the zoom lenses $L_1$ and $L_2$ will first be described. Thereafter, operation of the mechanism will be set forth.

Preferably, if interchangeable lenses are employed, lenses $L_1$ and $L_2$ are relatively rotated as mounted on their respective cameras. They are rotated so that the vectors set forth in FIGS. 6A and 6B are aligned parallel.

It has been found that for most production lenses, centration varies in a linear fashion as the lens is zoomed. By relative rotation between the respective lenses $L_1$ and $L_2$, the centration vector between the respective lenses can be aligned to an axis—here shown in a horizontal axis 20 connecting the two center lines 21 and 22 of the respective lenses $L_1$, $L_2$. When the lenses are so aligned as indicated by the vector 24, synchronous zooming can occur with all relative decentration between the two lenses $L_1$ and $L_2$ occurring in the direction of vector 24.

Prior to shooting, the respective lenses are aligned so that their lens axes verge at the desired object to be placed in the plane of convergence. For example, and assuming that a subject was 20 feet away from the respective cameras, camera $C_1$ would be angularly inclined with respect to camera $C_2$ so that the respective center lines 21, 22 intersected at a distance of 20 feet from the camera.

The vergance of the respective lenses $L_1$, $L_2$ would be made with the lenses moved to a position of maximum magnification so that the greatest accuracy can be obtained using the target method. Thereafter, centration changes will be a decreasing effect as the lenses are zoomed from maximum magnification down to lesser magnifications.

Assuming that both lens centers are moved, the relative change in centration between the respective lenses $L_1$, $L_2$ can be represented by a single vector 24 plotted at one or the other of the respective center lines 21, 22. Here vector 24 is shown protruding from the center line 21 of lens $L_1$.

Assuming that the relative centration between lenses $L_1$ and $L_2$ changes with decreasing zoom in the direction of arrow 24, there are possible three respective solutions. First and preferred, a variable optical wedge could be inserted in front of one of the lenses $L_1$ or $L_2$. Secondly, the camera $C_1$ can be panned in azimuth parallel to the mount 30 to which it is fastened. Thirdly, as shown in FIG. 1, the lens of camera $L_1$ can be moved so that its axis is in fixed parallel relationship with the axis of camera $L_2$ lens axis, towards or away from camera $L_2$.

It will be appreciated that with some lens systems, change in focus as well as change in zoom can produce centration changes. These centration changes may not be coincident one with another. With commercial lenses heretofore examined, changes in focus produce changes in centration similar to zooming. Where differing changes of centration result, appropriate adjustment can be made. Referring to FIG. 1, each of the cameras is biased downwardly to and upon a vertical screw 41 for camera $C_1$ and 42 for camera $C_2$ by respective rubberbands 43, 44. A pivot 45 shown in FIG. 2 effects this result.

Assuming that there are minor centration variations for differing focus settings, relative adjustment of knob 41 relative to knob 42 produces the desired change.

It will be appreciated that the process here set forth between the respective paired cameras for production zoom lenses could be controlled in a number of ways. Heretofore I have used manual adjustment of respective threaded shafts. It will be appreciated that cam surfaces actuated by the zoom controls themselves can be just as well used.

It should be pointed out that in the embodiment given above, with one or both of the cameras rotated upward or downward, or to the left or right, in order to fulfill the conditions of either no recentration or relatively zero recentration, certain compromises are involved. Spurious vertical parallax may be added to all image points not in the plane of convergence, but in actual practice the values of such parallax have been observed to be of tolerably low values.

Figure 2:
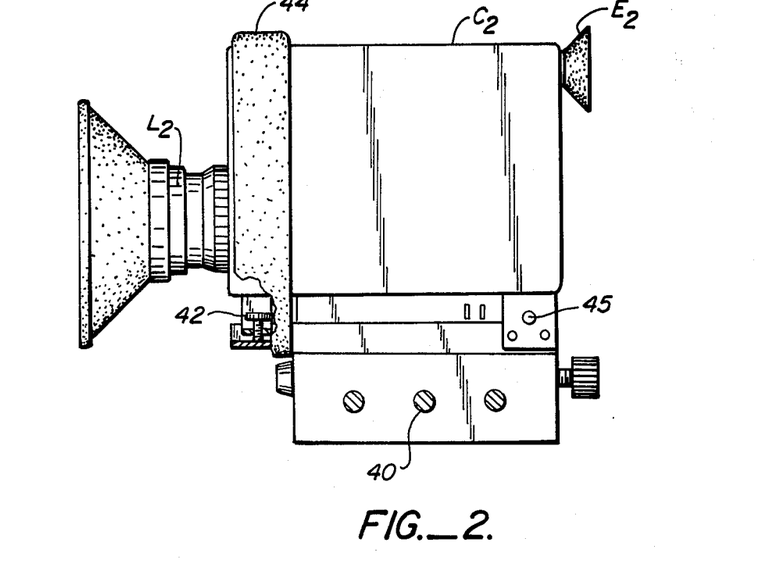
FIG. 2 is a side elevation of one of the cameras of FIG. 1 illustrating the mounting of a typical camera.
Figure 3:
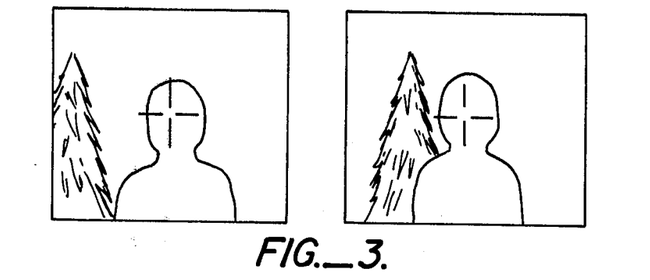
FIG. 3 is an illustration of the respective view finders used in the cameras of FIG. 1 illustrating convergence or centration setting using the target method.
Figure 7A:
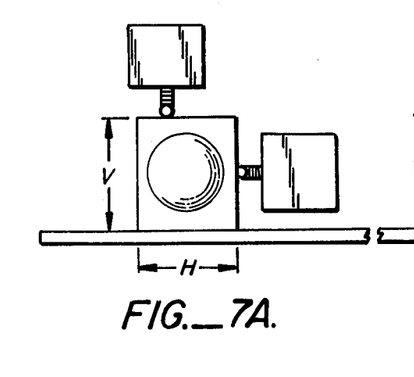
FIG. 7 is a front elevation view illustrating lens translation to effect compensation for recentration.
Figure 7B:
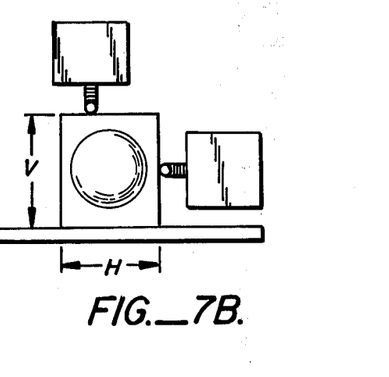

In some camera configurations, as shown in FIGS. 1 and 2, it may be far simpler to employ the method of rotation of the entire camera, through incremental panning or tilting, to compensate for recentration than to use the optically superior and more elegant method of laterally shifting the lens shown in FIG. 7. For example, some cameras have built-in zoom objectives and in such a case rotation of the camera is possible while lateral shifts of the lens mount are clearly impossible.

Reference to FIG. 7 will help to illustrate a method for overcoming certain objections inherent in the foregoing method of incremental panning and/or tilting to correct for recentration. The lens is affixed to the camera by means of a sliding lens board similar to that employed in still photography for view cameras. The plane of the board is parallel to the plane of the film, and the lens axes are always held perpendicular to the plane of the film. The board of one or both cameras A or B may be slid in either or both the vertical or horizontal direction in order to compensate for recentration. In other words, with reference to FIG. 5B, such lateral lens shifts can serve to align shifted lens axis 5 with true lens axis 6.

The action of the boads may be cam actuated, or electrically or electronically synchronized to the focusing and/or zoom position of the lens mount as set forth elsewhere in this disclosure. As illustrated here, stepper motors operating lead screws using ball bushings press against the sliding board.

Figure 8:
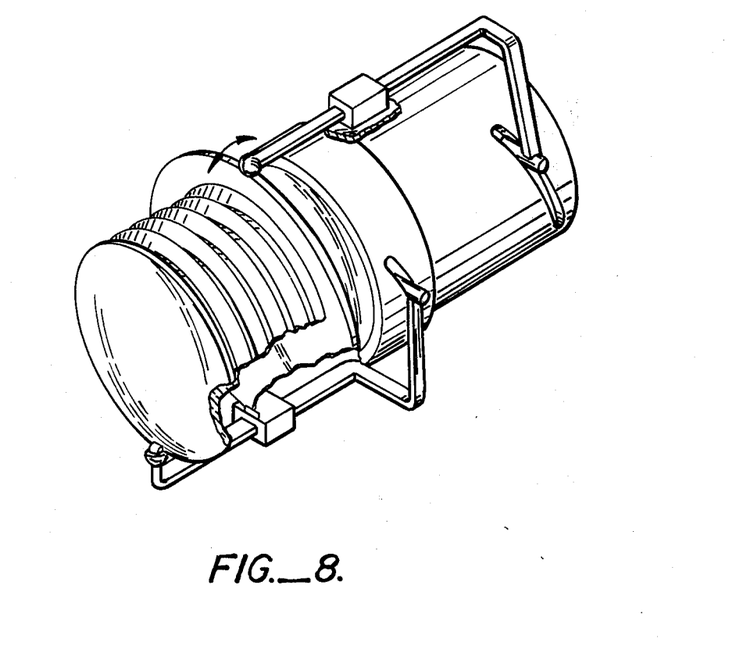
FIG. 8 shows the construction and placement of a fluid filled variable diopter power prism used for recentration compensation using mechanical control means.
Figure 9:
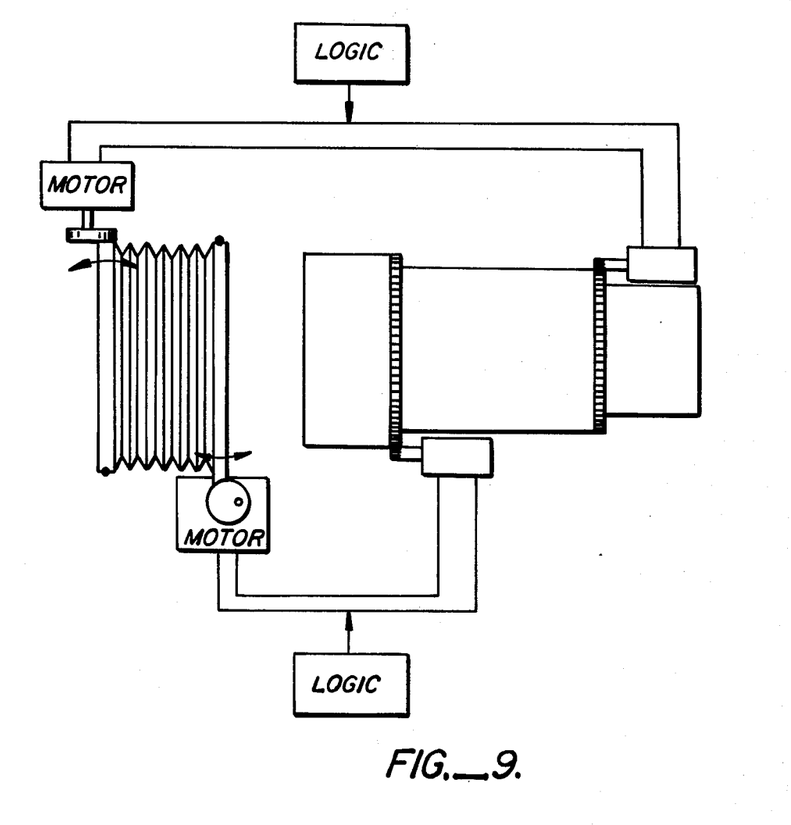
FIG. 9 shows a pair of variable power fluid filled prisms given in FIG. 8 applied to the correction of zoom and focus induced recentration using electronic control means.

A further and preferred method using liquid filled wedge-shaped prisms of variable low diopter power, as shown in FIGS. 8 and 9, may also be employed for correction of recentration. In this case the variable wedges are mounted in front of the lens and their front or rear surfaces are moved to achieve the ends explained above.

FIG. 8 shows the method of construction of such a variable diopter power prismatic wedge. Two optically flat and transparent glass or plastic plates make up the front and rear surfaces of a closed fluid filled chamber. The flats are parallel when zero dioptric correction is required and spaced some convenient distance apart. When the flats are perfectly parallel there is zero dioptric correction. When one of the flats is tilted or rotated about an axis passing within the plane of the plate light passing through the plate-fluid-plate ensemble will be refracted at some angle proportional to the rotation of the plate or plates. The fluid is selected so that it has an index of refraction and dispersion equal to that of the plates, and in the embodiment shown here, accordian pleats are used to enclose the fluid to allow for proper expansion of the container during movement of a plate.

Cam followers run in slots cut or added to rotatable lens control surfaces for zoom and focus corresponding with recentration curves plotted as shown in 6A and 6B. The arm attached to the cam followers are held in place by the bushings shown, in order to activate the ball joints shown mounted on the front and rear surfaces of the variable wedge.

Such variable fluid-filled prisms are familiar to the art and have been employed in another context, namely for image stabilization for motion picture or television cameras as employed by the Dynalens system. However, as embodied here, such correction for recentration effects, to my knowledge, is unknown in the prior art.

It should further be pointed out that the embodiment shown here with accordian pleats or bellows is only one of many possible methods of construction which would in no way alter the basic optical principal and I do not limit myself to this particular design.

FIG. 9 shows such a liquid filled variable diopter power prismatic wedge mounted in front of a zoom lens. In this case servo or stepper motors are employed for control. It will be understood that when the optical flats are parallel they must also be perpendicular to the lens axis. Depicted here for the sake of illustration I show the front and rear plates rotated orthogonally to each other. This is a condition which in practice would rarely occur, and is shown here simply to convey that each plate's rotation will be positioned to account for and to control recentration effects resulting from changes in focus and for changes in focal length and that these changes will take place, respectively, at different angles.

Thus the rotation of each plate is so positioned so that it can effectively cancel any recentration for absolute correction, or in the case of relative correction, it can be made to follow the recentration of the companion half of the stereoscopic zoom lens.

Since the centration vectors follow linear plots, simple rotation of a single plane surface of a wedge will effectively solve the problem, provided that the axis of rotation of the window of the wedge lies in a plane passing through a line at right angles to the centration vector.

It should be pointed out that it would also be possible to rotate a single window in two planes to accomplish the same focus and zoom centration effects, or to control both horizontal and vertical components of a specific centration vector.

The variable power wedges shown here are simple to construct, relatively inexpensive, may be added to any existing lens system, and are very easy to control once put in place. They are the preferred embodiments of the invention and may be employed with cameras using non-interchangeable lenses, or cameras using interchangeable lenses, and may also be employed with either single or double band systems of photography.

It is also important to understand that either focus or zoom centration may be dealt with, and not necessarily both. For example, the method shown here could also be used to control focus recentration of matched pairs of prime (non-zooming) objectives.

A number of different mechanical, electrical, or electronic techniques may be employed to correlate the tracking of the recentration of one lens with respect to the other. As stated, if the recentration of the left and right lenses is the same, in terms of magnitude and direction, for a given focal length or focusing distance, then the relative recentration for the objective pair will be a net of zero. Thus no shifts in screen parallax will take place.

Various means can be provided to sense the exact position of the focus or zoom mounts of the lens and to convey this information to the actual correction device, be it tilting or panning of the camera, lateral shifting of the lens board, or varying the diopter power of the wedge, and these techniques are well traveled art known to workers in this and other fields. For example, since the centration vector is generally a linear function the problem is greatly simplified and various means may be provided to sense the zoom or focus setting. Simple mechanical means using linkage may be used, and electrical or electronic means using a stepper motor, or both the rotating mounts may be controlled by servo motors linked electrically to slave motors activating the centration correction device. The centration control device could as well be controlling the tilting and panning method, or the lateral shifting of the lens board method and I do not mean to limit this description to the variable power wedge alone.

Once we know how the centration of each lens varies, by plotting curves as shown in FIGS. 6A and 6B, we may use these curves to keep both lenses perfectly centered, or to control the recentration of one of the lenses so that it exactly matches the other. In the former case both lenses must be controlled; in the latter only one must be controlled since its centration can be made to track the centration of the master lens. The master lens remains uncontrolled, with the slave lens centration made to match that of the master.

This positional information remains a function of either the focus distance or focal length parameters, and by electrical, electronic, or mechanical means—or by any combination of the three—the slave lens is made to effectively recenter to confrom to the master pattern.

In the foregoing specification of my preferred apparatus and process, I have illustrated a system for a stereoscopic zoom lens utilizing production zoom lenses which has been successfully used to experimentally take binocular stereoscopic film in three-dimensions with respective corresponding image points falling within Panum's fusional limit (about 1/10 of a degree in the vertical plane). It will be appreciated that those skilled in the art will wish to make modification without departing from the scope of this invention.

I have placed in the claims appended hereto the term "change in zoom in at least magnification and/or focus". First, the techniques for changing focus are identical for the techniques used where changed magnification is concerned. Secondly, each lens will have at least two curves. One of these curves will be the changes of centration upon changes in focus; the other of these curves will be the changes of centration upon changes in magnification. The broad principle, however, is the same in both cases.

What is claimed is:

1. A process for taking stereoscopic zoom three-dimensional pictures comprising the steps of providing first and second cameras spaced a predetermined distance apart for photographing the same scene; mounting to said respective cameras respective first and second substantially identical zoom lenses; synchronizing said cameras to zoom to change focus and/or magnification simultaneously and identically; setting said lenses of each of said cameras to a predetermined distance and aligning the vergence of said respective lenses to coincide on an object in said scene at the desired distance; moving the field of view of at least one camera relative to the field of view of the other camera in a predetermined manner upon change of zoom in focus and/or magnification to maintain centration between said cameras in order to prevent spurious parallax between said respective fields of view.

2. The invention of claim 1 including synchronizing the shutters of said cameras for taking respective pictures of said film synchronously.

3. The process of claim 1 and wherein said aligning the vergence step includes setting said synchronized zoom lenses to maximum magnification before said aligning of vergence step.

4. The process of claim 1 and wherein said moving at least one camera step comprises moving one of said cameras in roll, pitch and/or yaw.

5. The process of claim 1 and wherein said moving said camera step includes inserting an optical wedge between said scene and the film plane of one of said cameras and manipulating said optical wedge upon change of focus and/or magnification.

6. The process of claim 1 and including the step of aligning said respective lenses in relative rotation on said cameras to coincide changes in centration with respect to change zoom in focus and/or magnification.

7. A process of claim 1 and including moving at both said cameras with respect to the scene to identically coincide the centration of said cameras upon change of zoom in focus and/or magnification.

8. The process of claim 1 and wherein said moving step includes measuring the change of centration of both lenses on said cameras with respect to change of zoom in focus and/or magnification, plotting said change of focus for each of said lenses upon changes of zoom in focus and/or magnification and thereafter summing said plots and moving one of said cameras responsive to the sum of said plots to coincide changes in centration upon changes in zoom in focus and/or magnification.

9. The process of claim 1 and wherein said motion of one of said camera lens relative to the other of said camera lens comprises translation of at least one of the lenses of one of said cameras relative to the other lens of the other camera.

10. The process of claim 9 and wherein said respective lenses are rotated to align changes in centration to a single direction.

11. The process of claim 1 and wherein said centration vectors are chosen for change of zoom in focus.

12. Apparatus for the taking of stereoscopic three-dimensional pictures comprising in combination paired first and second spaced apart cameras, first and second zoom lenses mounted to said respective cameras for changing zoom in at least focus or magnification; said zoom lenses on said respective cameras actuated to change zoom in either focus and/or magnification simultaneously and identically; means to prevent spurious vertical and horizontal parallax between the respective pictures taken by said first and second cameras comprising means to move one camera with respect to the other camera in a predetermined manner to maintain centration of said image fields of said cameras unchanged upon change in zoom in magnification and/or focus.

13. The apparatus of claim 12 and including means extending between said cameras for synchronizing the movement of the shutters of said camera for taking frames simultaneously.

14. The invention of claim 12 and wherein said means to move one camera with respect to the other camera includes means for translating at least the lens of one camera relative to the lens of the other camera.

15. The invention of claim 12 and wherein said means to move one camera with respect to the other camera includes means for moving one said camera in roll, pitch and/or yaw to maintain identical centration.

16. The invention of claim 12 and wherein said means extending between said cameras to change the relation between said cameras constitutes means for translating at least one of said cameras.

17. The invention of claim 12 and wherein said means for changing the relative movement between said cameras includes means for changing the respective angularities between said cameras.

18. Apparatus for taking stereoscopic three-dimensional pictures comprising in combination paired first and second spaced apart cameras; first and second zoom lenses mounted to said respective cameras for changing zoom in at least focus and/or magnification; said zoom lenses on said respective cameras actuated to change zoom in either focus and/or magnification simultaneously and identically; means to prevent spurious vertical and horizontal parallax between the respective pictures taken by said first and second cameras comprising means for translating the lens of one of said cameras with respect to the lens of the other of said cameras in a predetermined manner to maintain the centration of the fields of view of said cameras unchanged upon change in zoom in magnification and/or focus.

19. Apparatus as in claim 18 wherein said means for translating the lens of said cameras in a predetermined manner includes means for referencing empirical data of the variations of centration of said fields of view of said cameras as a function of zoom.

20. Apparatus for the taking of stereoscopic three-dimensional pictures comprising in combination paired first and second spaced apart cameras; first and second zoom lenses mounted to said respective cameras for changing zoom in at least focus and/or magnification; said zoom lenses on said respective cameras actuated to change zoom in either focus and/or magnification simultaneously and identically; means to prevent spurious vertical and horizontal parallax between the respective pictures taken by said first and second cameras comprising means for moving one camera with respect to the other camera in roll, pitch and yaw in a predetermined manner to maintain centration of the fields of view of said cameras unchanged upon change in zoom in magnification and/or focus.

21. Apparatus as in claim 20 wherein said means for moving one camera with respect to the other in a predetermined manner includes means for referencing empirical data of the variations of centration of said fields of view of said cameras as a function of zoom.

22. Apparatus for the taking of stereoscopic three-dimensional pictures comprising in combination paired first and second spaced apart cameras; first and second zoom lenses mounted to said respective cameras for changing zoom in at least focus and/or magnification; said zoom lenses on said respective cameras actuated to change zoom in either focus and/or magnification simultaneously and identically; a variable optical wedge placed in front of one of said cameras and means to prevent spurious vertical and horizontal parallax between the respective pictures taken by said first and second cameras comprising means operatively connected between said zoom lens and said variable optical wedge for changing, in a predetermined manner, the power of said optical wedge responsive to changes in zoom in magnification and/or focus to maintain centration of said fields of view of said cameras unchanged upon changes in zoom.

23. Apparatus as in claim 22 wherein said means for changing, in a predetermined manner, the power of said optical wedge includes means for referencing empirical data of variations of centration of said fields of view, of said cameras as a function of zoom.

24. A process for taking stereoscopic three-dimensional pictures comprising the steps of providing first and second cameras spaced a predetermined distance apart for photographing the same scene; mounting to said respective cameras the respective first and second zoom lenses; synchronizing said cameras to zoom to change focus and/or magnification together simultaneously and identically; setting the lens of one of said cameras to a predetermined distance and aligning the central portion of said lens on an object in said scene; setting the other lens of said camera to the same object at said predetermined distance and aligning the vergence of said respective lens to coincide on the same object in that scene; moving the fields of view of both of said cameras with respect to each other in a predetermined manner to maintain identical centration of said lens upon changes in zoom and focus and/or or magnification in order to prevent spurious parallax between said first and second cameras.

25. A process as in claim 24 wherein the step of moving the fields of view of said cameras includes the step of referencing empirical data of variations of centration of said fields of view of said camera as a function of zoom.

26. A process for taking a stereoscopic three-dimensional picture comprising the steps of providing first and second movie cameras faced a predetermined distance apart for photographing the same scene; mounting to said respective cameras respective first and second zoom lenses; synchronizing said cameras to zoom to change focus and/or magnification simultaneously and identically; measuring and plotting the changes in centration of each of said lenses upon change in zoom in at least magnification and/or focus; summing the respective plots of said changes in zoom; moving at least one of said cameras relative to the other of said cameras upon change of zoom in at least focus and/or magnification to maintain identical centration between said cameras, said movement being responsive to the sum of said plot.

* * * * *